United States Patent Office 3,310,451
Patented Mar. 21, 1967

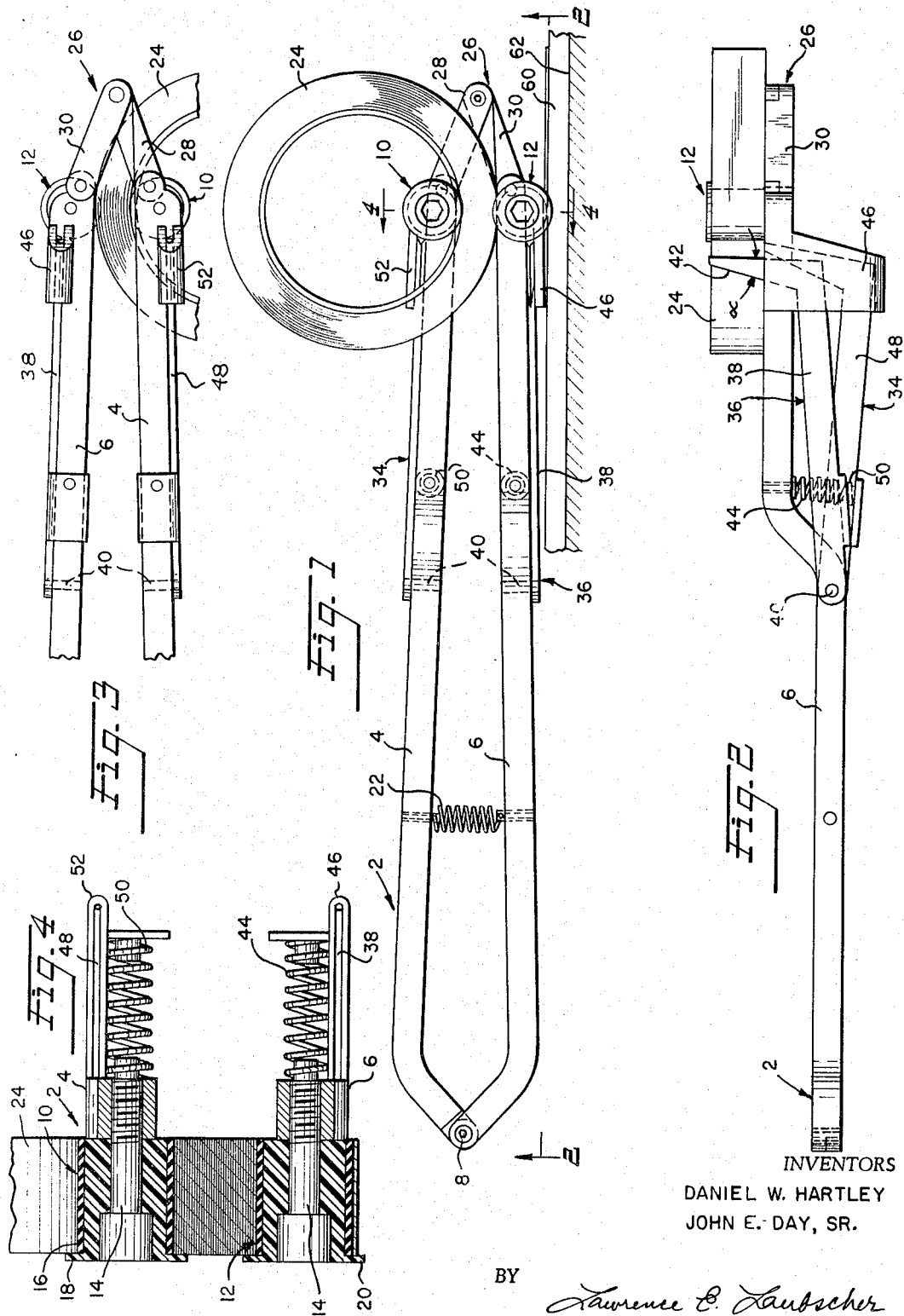

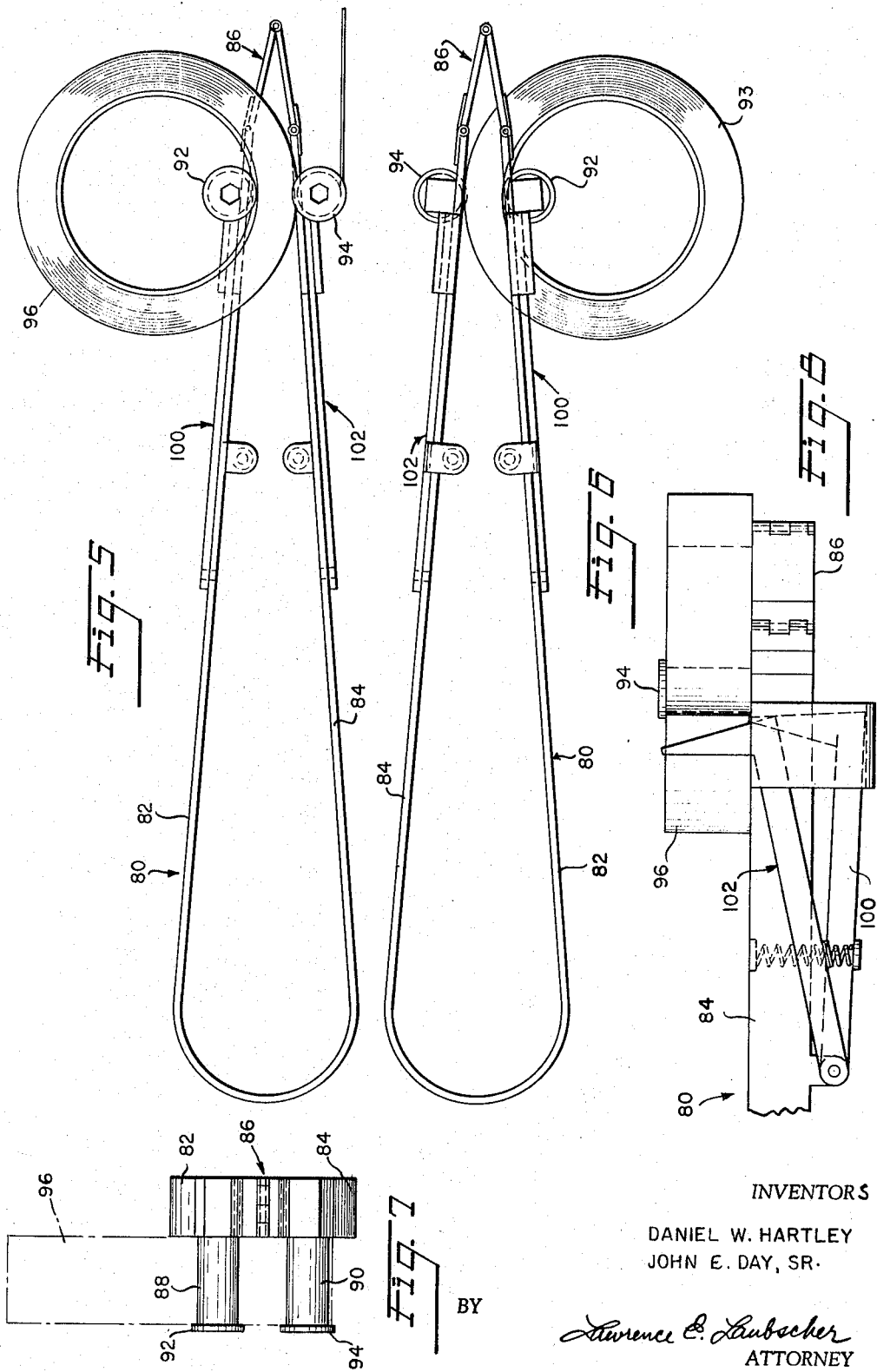

3,310,451
APPARATUS FOR DISPENSING AND APPLYING PRESSURE SENSITIVE TAPE
Daniel W. Hartley, 304 Mosstree Road, and John E. Day, Sr., 400 Arant St., both of North Charleston, S.C. 29406
Filed June 1, 1964, Ser. No. 374,555
11 Claims. (Cl. 156—523)

This invention relates generally to apparatus for dispensing pressure sensitive tape from a hollow cylindrical supply roll and for applying the tape upon a fixed surface. More specifically, the invention relates to a manually operable tape applicator including handle means comprising a pair of interconnected, relatively movable rigid legs, and roller means connected with the free ends of the legs for engaging the inner and outer peripheries of the supply roll, respectively, said outer roller being operable to simultaneously guide the tape during the dispensing thereof and to press the tape upon the work.

Various devices have been proposed in the past for dispensing pressure sensitive tape from a hollow supply roll. In one type of apparatus, the tape is withdrawn from a stationary dispenser, is severed, and the cut tape length is manually applied to the work. Other dispensing devices of a portable nature have been proposed for directly applying the tape to the work prior to severing of the tape from the supply roll. An example of this latter type of dispensing apparatus is disclosed in the U.S. patent to Burns, No. 2,493,737, that issued on January 10, 1950.

The known tape dispensing and applying devices are of rather expensive and complex construction. In general, the devices of the prior art are rather large and massive, and consequently are not easily manipulatable to apply the tape to relatively inaccessible surfaces or to surfaces of unusual configuration or contour. For example, in the masking of chrome trim strips prior to the painting of automobiles, many of the elements to be masked—particularly those adjacent the lower portions of the car—are rather difficult to reach with the known tape applicators, and consequently the manual application of severed tape lengths is normally resorted to, thereby resulting in a time-consuming masking operation. Furthermore, owing to the difficulty in accurately applying the tape manually, quite often it is necessary to additionally trim the applied tape with a razor blade or other cutting tool.

In order to avoid the drawbacks of the known devices, a primary object of the present invention is to provide an improved manually-operable tape applying device that is of simple inexpensive construction, that is easily manipulated, that is reversible for right or left-hand operation, that affords accurate guiding of the tape during application thereof upon a fixed surface, and that readily permits the insertion and removal of a hollow tape supply roll.

A more specific object of the invention is to provide a tape applying device including handle means consisting of a pair of interconnected relatively movable rigid legs, and roller means carried by the free ends of said legs for engaging the inner and outer peripheries of a hollow tape supply roll. Means are provided for biasing the legs toward each other whereby the rollers are maintained in engagement with the inner and outer peripheries of the roll as the roll thickness decreases during dispensing of the tape therefrom. In accordance with one feature of the invention, during application of the tape to a fixed surface, the tape is guided from the roll back upon the periphery of the outer roller and this outer roller serves as a pressing roller for pressing the tape upon the surface.

A further object of the invention is to provide a tape applicator of the type described above wherein the rollers that engage the inner and outer peripheries of the supply roll are in abutting engagement at one end with the respective rigid legs of the handle means and are provided with annular flanges spaced from said legs a distance equal to the width of the tape supply roll. Consequently, the flanges and the legs cooperate to prevent axial displacement of the tape supply roll relative to the handle means. Furthermore, the flange on the outer roller serves both to guide the tape as it travels about the outer periphery of this roller and to guide the tool as it is drawn along the edge of an object to which the tape is being applied. An important advantage resulting from the guiding of the tool by the roller flange means is the appreciable reduction in time required to accurately apply the tape to the work.

According to a further object of the invention, cutter means are provided that are displaceable from a retracted position within a protective sheath to a cutting position adjacent the outer roller on the side thereof about which the tape is guided. These cutting means are operable to effect quick, efficient severing—with a minimum amount of waste—of a length of tape that has been applied to a fixed surface. In accordance with one feature of the invention, the cutting edge of the severing means is arranged at an acute angle relative to the transverse axis of the tape to effect progressive shearing of the tape across the width thereof, whereby irregular tearing of the tape is avoided.

A more specific object of the invention is to provide a portable tape dispensing and applying device of the type described above including means connected between the free extremities of the legs for preventing relative lateral movement therebetween. The cooperation between the stabilizing means, which in the preferred embodiments comprise pivotally connected hinge members, the pair of flanged rollers and the spring-biased legs securely maintain the supply roll in place on the handle means during the tape applying and severing operations.

Other objects and advantages of the invention will become apparent from a study of the following specification when considered in conjunction with the accompanying drawing, in which:

FIGURE 1 is a side elevational view of one embodiment of the tape applying apparatus and illustrates the manner in which the pressure-sensitive tape is applied to a fixed surface;

FIGURE 2 is a bottom plan view taken along line 2—2 of FIGURE 1;

FIGURE 3 is a detailed elevational view of the apparatus of FIGURE 1 rotated 180 degrees about its longitudinal axis;

FIGURE 4, is a sectional view taken along line 4—4 of FIGURE 1;

FIGURE 5 is a side elevational view of another embodiment of the invention;

FIGURE 6 is an elevational view of the apparatus of FIGURE 5 rotated 180 degrees about its longitudinal axis;

FIGURE 7 is an end view of the tape applicator of FIGURE 5 with the supply roll removed; and FIGURE 8 is a detailed top plan view of the apparatus of FIGURE 6.

Referring first more particularly to FIGURES 1-4, the tape applicator comprises a handle 2 including a pair of rigid legs 4 and 6 (formed of metal or other suitable hard material) that are pivotally connected at one end by pivot means 8. Rotatably connected with the free ends of the rigid legs 4 and 6 are a pair of rollers 10 and 12, respectively. As shown in FIGURE 4 the rollers 10 and 12 are parallel and are arranged on the same side of the handle 2. The rollers, which are formed of synthetic plastic, metal or other suitable material, are journalled upon bolts 14 that are threaded at one end in corresponding bores in the sides of the rigid legs. The peripheral surfaces of the rollers are covered with a layer 16 or resilient material, such as rubber, to effect frictional contact with the peripheral surfaces of the supply roll and the non-gummed surface of the tape as will be described in greater detail below.

At one end the rollers 10 and 12 abut the legs 4 and 6, and at the other end the rollers are provided with annular flanges 18 and 20 that are spaced from the corresponding legs a distance equal to the width of the tape supply roll. Spring 22 is connected between the legs and serves to bias the free ends thereof toward each other. Consequently, when the supply roll 24 of pressure sensitive tape is mounted between the rollers 10 and 12 as shown in FIGURE 1, the spring 22 serves to press the rollers 10 and 12 against the inner and outer peripheries, respectively, of the supply roll. Axial movement of the supply roll 24 relative to the handle 2 is prevented by the annular flanges 18 and 20.

In order to prevent relative lateral displacement of the free ends of the legs and to stabilize the mounting of the supply roll on the handle frame, hinge means 26 are provided. The hinge means comprise a pair of hinge members 28 and 30 that are pivotally connected at one end with each other and at the other end with the extremities of legs 4 and 6, respectively. The pivot axes of the hinge members 28 and 30 are parallel with the pivot axes 8 between the interconnected ends of the legs.

In order to sever tape that has been applied to a fixed surface, cutter means 34 and 36 are provided on the legs 4 and 6, respectively. As best shown in FIGURE 2, the cutter means 36 comprises a generally L-shaped element 38 the longer arm of which is pivotally connected at one end with leg 6 by a pivot pin 40. At the other end the shorter arm of the member 38 carries a knife edge 42 that, when in the illustrated severing position is adjacent, generally parallel with, and directed away from roller 12. The length of the knife edge is equal to or greater than the width of the supply roll. Preferably the knife edge 42 is inclined at an acute angle "α" to a line transverse to the longitudinal axis of the tape whereby during cutting, the tape is progressively severed in the transverse direction thereof. Spring means 44 are provided that bias member 38 in the clockwise direction (as viewed in FIGURE 2) toward a retracted position within a protective sheath or guard 46 which is rigidly secured to leg 6. Guard 46 has a generally U-shaped cross-secton and is open at each end. Similarly, the cutting means 34 includes an identical L-shaped element 48 that is normally biased by spring 50 toward a retracted position within a protective sheath 52 secured to leg 4.

OPERATION

Assume that the supply roll is mounted between rollers 10 and 12 as shown in FIGURE 1 and that it is desired to mask the trim strip 60 of an automobile prior to painting the body surface 62. The free end of the tape is withdrawn from the roll and is guided back upon the periphery of the outer roller 12. The tape is pressed upon the trip strip 60 and the handle 2 is manually displaced to the left (as viewed in FIGURE 1), pressure being applied to the handle to cause roller 12 to press the tape upon the trim strip. During this longitudinal displacement of the handle, the supply roll 24 is rotated between the rollers 10 and 12 as the tape is drawn from the roll and is pressed upon the trim strip. Owing to the frictional engagement between the resilient cover layers on the rollers and the tape and supply roll surfaces, the rollers are caused to rotate during the application of the tape, thereby improving the tape applying operation. Flange 20 on roller 12 serves not only to properly orient the tape as it is guided back upon the roller 12 but also to guide the handle 2 during manual longitudinal displacement thereof. Consequently, the invention offers the advantage that the tape may be quickly applied to the trim strip in a most efficient manner.

It is important to note that the resilient covers on the rollers perform the additional function of enlarging the pressure surface area when the tape is applied to work surfaces of unusual contour, thus assuring uniform pressing of the tape upon the work.

When the masking of the trim strip has been completed, the handle 2 is displaced further to the left to withdraw an additional short length of tape from the spool. The handle 2 is then displaced a short distance to the right to produce a small loop in the tape to the left of the roller. The cutter element 38 is pivoted against the biasing force of spring 44 to place knife edge 42 in the cutting position illustrated in FIGURE 2 (and consequently within the aforementioned loop), whereupon the handle 2 is sharply displaced to the left to effect severing of the tape by the knife edge 42. The cutter member 38 is then released and is pivotally returned to the retracted position by spring 44.

According to an additional feature of the invention, the applicator is designed for reversible operation to permit use by right or left-handed persons with equal facility, or to permit application of the tape in either direction upon the work in accordance with its physical location and accessibility. In this regard, the tape supply roll may be so mounted between the rollers that the rollers 10 and 12 constitute the outer and inner rollers, respectively, and consequently application of the tape upon the work is effected in the direction opposite from that previously described (i.e., from left to right in FIGURE 1).

Referring now to FIGURES 5–8, in accordance with another embodiment of the invention the handle means 80 comprises a generally U-shaped spring metal element including a pair of rigid legs 82 and 84 the free ends of which are continuously biased—as a result of the inherent resiliency of the element—toward each other. As in the embodiment of FIGURES 1–4, hinge means 86 are connected between the free extremities of the legs to prevent relative lateral displacement therebetween. Rollers 88 and 90, having annular flanges 92 and 94, respectively, are rotatably connected with the extremities of legs 82 and 84. The flanges are spaced from the legs 82 and 84 a distance equal to the width of the tape on supply roll 96. Cutter means 100 and 102 are connected with the legs 82 and 84 in a manner identical to that of the embodiment of FIGURES 1–4. Since the handle means of this second embodiment are unitary, the cost of manufacture is somewhat less than that of the embodiment of FIGURES 1–4.

While the present invention is particularly adapted for masking trim strip surfaces prior to the painting of automobiles, it is apparent that the invention has utility in accurately applying tape to other surfaces—such as walls, furniture, window panes and the like—prior to painting, as well as the application of tape during the wrapping, decorating and sealing of packages, the edge taping of articles, and numerous other uses.

It should be further mentioned that the flanges on the rollers positively insure the application of the masking tape to the chrome trim strip only so that a space is left between the edge of the tape and the body of the automobile. Consequently, subsequent application of the paint to the body and to at least a small portion of the surface beneath the trim strip is permitted. Owing to the provision of the flanges on the rollers and the resulting space between the tape-covered chrome and the body, the tape does not touch the body, and consequently following painting, there will be no binding of the tape or peeling of paint from the body upon removal of the tape.

While in accordance with the provisions of the patent statutes we have illustrated and described the best forms and embodiments of the invention now known to us, it will be apparent to those skilled in the art that various changes may be made in the apparatus described without deviating from the invention set forth in the following claims.

We claim:
1. A tape applicator for dispensing pressure sensitive tape from a hollow cylindrical tape supply roll, comprising
 handle means including a pair of rigid legs mutually connected at one end to permit movement of the free ends of said legs toward and away from each other;
 a pair of parallel rollers on one side of said handle means, said rollers being normal to and rotatably connected with the free extremities of said legs, respecitvely, and
 means biasing the free ends of said legs toward each other, whereby when said rollers are arranged in engagement with the inner and outer peripheries of said supply roll, the tape may be withdrawn from the supply roll and guideed back upon the periphery of the outer roller for pressing application upon a fixed surface.

2. Apparatus as defined in claim 1, and further including stabilizing means mutually connecting the free ends of said legs to prevent relative lateral displacement therebetween.

3. Apparatus as defined in claim 2 wherein said stabilizing means comprise hinge means including a pair of hinge members pivotally connected at one end with each other and at the other end with the free extremities of said legs, respectively, the pivotal connections at each end of said hinge members having axes parallel with said rollers.

4. Apparatus as defined in claim 1 wherein at one end said rollers abut said legs, respectively, each of said rollers including on the periphery thereof an annular flange spaced from the associated leg a distance substantially equal to the width of said supply roll, whereby said supply roll is maintained against axial displacement relative to said handle means.

5. Apparatus as defined in claim 4, and further including tape severing means connected with at least one of said legs, said severing means including a knife edge adjacent, substantially parallel with, and directed away from the axis of the roller associated with said legs, said knife edge having a length substantially equal to width of the supply roll.

6. Apparatus as defined in claim 5 wherein said severing means includes a cutter element carrying said knife edge, said cutter element being pivotally connected with said leg for movement to a retracted position wherein said knife edge is remote from said roller, and spring means biasing said cutter element toward said retracted position.

7. Apparatus as defined in claim 6, and further including sheath means connected with said one leg for substantially enclosing said knife edge when the cutter element is in the retracted position.

8. Apparatus as defined in claim 1 wherein said legs are pivotally connected at one end with each other.

9. Apparatus as defined in claim 1 wherein said handle means comprises a unitary U-shaped spring metal element the legs of which are resiliently biased toward each other.

10. A tape applicator for dispensing pressure sensitive tape from a hollow cylindrical tape supply roll, comprising
 handle means including a pair of rigid legs pivotally connected together at one end;
 spring means biasing the free ends of said legs toward each other;
 stabilizing means connected between the free extremities of said legs for preventing relative lateral displacement therebetween;
 a pair of rollers on one side of said handle means, said rollers being parallel with the pivot axis of said legs and being rotatably connected with the extremities of said legs, respectively, each of said rollers being in abutting engagement at one end with the associated leg and including an annular flange spaced from said leg a distance equal to the width of said supply roll; and
 tape severing means including a cutter element pivotally connected with one of said legs, said cutter element having a knife edge and being pivotable to a tape severing position in which said knife edge is adjacent, substantially parallel with, and directed away from the axis of said roller, said knife edge in said severing position being intermediate said roller and the pivotally connected ends of said legs, said cutter element being also pivotable to a retracted position wherein said knife edge is remote from said roller, and spring means biasing said cutter member toward said retracted position.

11. A tape applicator for dispensing pressure sensitive tape from a hollow cylindrical supply roll thereof, comprising
 a U-shaped spring metal handle including a pair of rigid legs the free ends of which are resiliently biased toward each other;
 means connected between the free extremities of said legs for preventing relative lateral displacement therebetween;
 a pair of parallel rollers on one side of said handle, said rollers being normal to and rotatably connected with the extremities of said legs, respectively, each of said rollers being in abutting engagement at one end with the associated leg and including an annular flange spaced from said leg a distance equal to the width of said suply roll, whereby when said rollers are arranged in engagement with the inner and outer peripheries of said supply roll, said tape is withdrawn from said supply roll and is bent back upon substantially half the periphery of the outer roller; and
 tape severing means including a knife element movable to a cutting position adjacent, substantially parallel with and directed away from the side of said outer roller upon which said tape is guided, said knife element being movable to a retracted position remote from said roller, and spring means biasing said knife element toward said retracted position.

No references cited.

EARL M. BERGERT, *Primary Examiner.*

D. S. DRUMMOND, *Assistant Examiner.*